United States Patent [19]

Paulin

[11] Patent Number: 4,999,711
[45] Date of Patent: Mar. 12, 1991

[54] DIGITAL METHOD OF MODIFYING AN IMAGE CONTRAST SO AS TO RETAIN IMAGING OF SMALL OBJECTS

[75] Inventor: Jacques Paulin, Sucy-en-Brie, France

[73] Assignee: U.S. Philips Corp., New York, N.Y.

[21] Appl. No.: 371,771

[22] Filed: Jun. 26, 1989

[30] Foreign Application Priority Data

Jul. 1, 1988 [FR] France .................. 88 08918

[51] Int. Cl.⁵ ............................................. H04N 5/57
[52] U.S. Cl. ..................... 358/169; 358/79; 358/455
[58] Field of Search ............... 358/169, 79, 455, 456, 358/429

[56] References Cited

U.S. PATENT DOCUMENTS

| 4,353,092 | 10/1982 | Bailey | 358/160 |
| 4,647,963 | 3/1987 | Johnson | 358/80 |
| 4,682,229 | 7/1987 | Clates | 358/166 |
| 4,730,212 | 3/1988 | Wojcik | 358/83 |
| 4,805,123 | 2/1989 | Specht | 358/105 |
| 4,878,114 | 10/1989 | Huynh | 358/101 |

FOREIGN PATENT DOCUMENTS

| 0078282 | 4/1982 | European Pat. Off. |
| 0213867 | 3/1987 | European Pat. Off. |
| 2555003 | 5/1985 | France |
| 2129635 | 5/1984 | United Kingdom |

Primary Examiner—Tommy P. Chin
Attorney, Agent, or Firm—William L. Botjer

[57] ABSTRACT

The method has for its object to enhance the contrast of an image, more specifically a low-contrast infrared image. The method is used in a system for putting the method into effect, more specifically an infrared camera operating in real time. The output image is structured with the aid of a transformation function (FI) one part of which (RCI) transforms the contrast of the warm points; the output histogram (HSI) has a higher contrast than the input histogram (HE). The point GO is determined for each image as a function of the characteristics of the input histogram (HE).

7 Claims, 3 Drawing Sheets

DIGITAL METHOD OF MODIFYING AN IMAGE CONTRAST SO AS TO RETAIN IMAGING OF SMALL OBJECTS

BACKGROUND OF THE INVENTION

The present invention has for its object to provide a digital method of modifying an image to obtain an output image on the basis of an input image, each image being defined by a set of picture elements, denoted pixels hereinafter, each pixel containing at least a digital value defining its grey level among a set of possible values, said method comprising: a first stage in which a histogram is established which is representative of the distribution in a percentage figure of the grey level of the pixels of said input image, a second stage in which, on the basis of the distribution characteristic of said histogram a correspondence function is established between the input and output grey levels, a third stage in which the output image is formed on the basis of the pixels of the input image and of said correspondence function, said correspondence function consisting of clipping the pixels having extreme grey levels and of linearly re-distributing the grey levels of the remaining pixels.

The present invention also has for its object to provide a digital system arranged for putting the method into effect.

This method applies to low-contrast images, more specifically infra-red images whose weak dynamic on the brightness scale is well known. The histogram of allow-contrast digitized image occupies only a small portion of the available grey levels.

In order to enhance the contrast, a known method is to linearly re-distribute, after clipping of the extreme levels, the input grey levels over all the available grey levels; however, this method has at least two disadvantages, as it has been found that in the first place in the case in which the input histogram is sufficiently large there is however, a gain in contrast which is not useful and often detrimental, in the second place for certain images in which there are small warm objects on a grey background, clipping the extreme pixels by a predetermined percentage has for its result that these small objects disappear, which is contrary to the envisaged object.

The present invention has for its object to obviate these disadvantages.

SUMMARY OF THE INVENTION

According to the present invention, a digital image modifying method is more specifically characterized in that clipping of the extreme pixels is effected on the basis of an input grey level value which is specific for each image and is determined during said second stage, said value being chosen so as to provide that the grey level corresponds to a change in the significant slope of the curve of the histogram, which change of slope is located between a predetermined first and a second accrued percentage figure.

Such a method utilises the original image histogram to good advantage as, because the clipping value varies from one image to the other, the small warm objects are not destroyed; the search for the point at which the slope of the histogram changes is therefore very important.

Moreover, in a preferred embodiment of the invention, at least the input pixels of one of the extremes are recovered in accordance with a transfer function which accentuates the contrast.

In the prior art methods, the contrast of the clipped extreme pixels was not simply recovered with the object of enhancing the contrast of the set of values by increasing the slope of the purely linear transfer function. The advantage obtained by the present invention, which does not essentially aim at enhancing the contrast of the overall picture but which has for its function to highly increase the contrast of the extreme grey levels, even at the cost of a slight loss in contrast over the pixels of the average grey levels, will here become apparent; the envisaged object is to preserve the information content of the image, which content often originates from the pixels of the extreme grey levels.

Depending on the type of image, it is possible to opt for the recovery of either a single extreme, warm or cold, or both of them.

For infrared images it is preferred to enhance only the contrast of the hot objects, that is to say the bright objects; actually, and particularly for military applications, for example night or fog vision . . . , the small warm objects are the most interesting objects: a soldier, a barrel of a gun just fired, . . . .

An advantageous transfer function for enhancing the contrast is the square root function; it can actually be programmed in a very simple manner in a calculator.

The value of the change in slope for clipping is advantageously searched for among the grey values located between two accrued percentage figures, more specifically 5% and 1%; the search can be effected in steps of 0.5% to try and find, when 128 grey levels are available, the passage through at least 5 grey levels which indicates a sufficient slope to satisfy the envisaged object.

The method according to the invention roughly has the advantage that it significantly improves the low-contrast images without deteriorating the images of a satisfactory contrast.

In addition it is sufficiently easy to put the method into effect so that it can be used in "real time", that is to say with a camera or a sighting telescope; in that case the successive images appear at a relatively high rate and the calculations required by the method must not introduce a prohibitive delay.

BRIEF DESCRIPTION OF THE DRAWINGS

The present invention and how it can be put into effect will be better understood by means of the non-limitative description of an example illustrated in the accompanying Figures.

DETAILED DESCRIPTION OF THE PREFERRED EMBODIMENTS

Figure 1B:
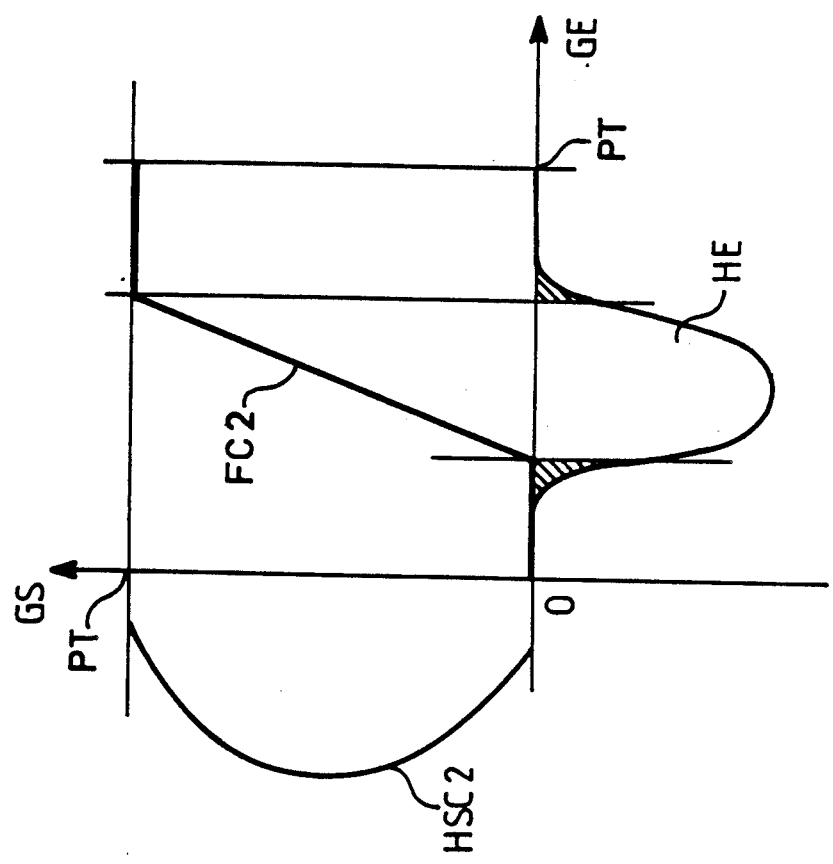
FIGS. 1a and 1b show known transfer functions.
Figure 1A:
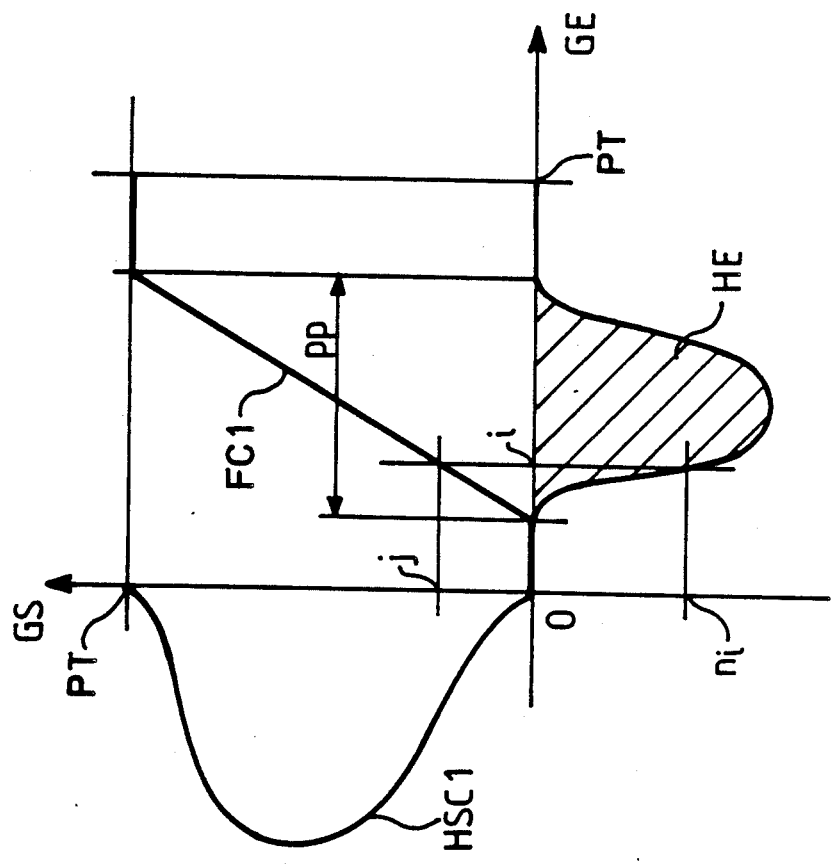
Figure 2A:
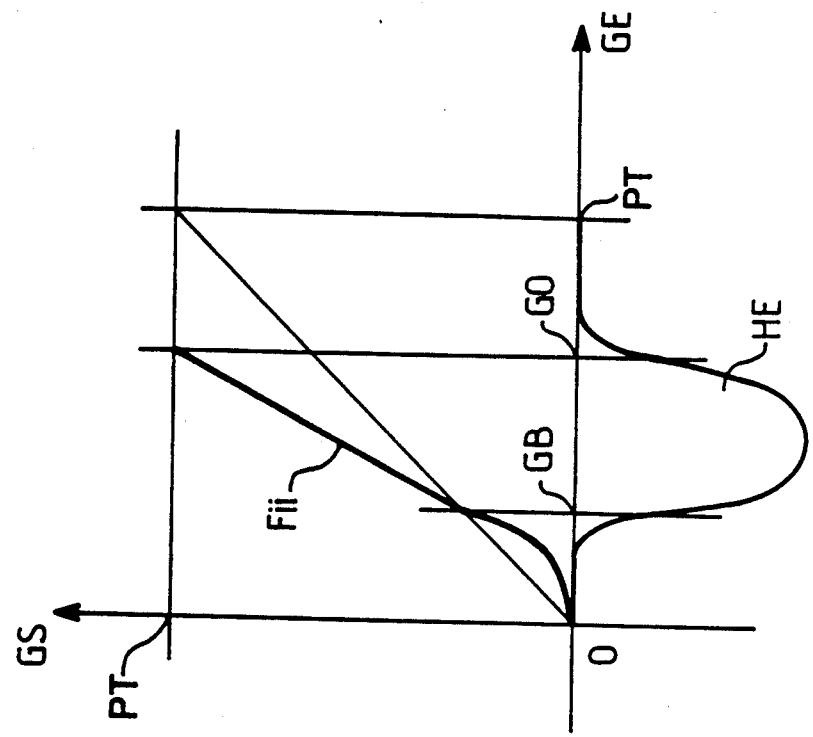
FIGS. 2, 2a, 2b show transfer functions in accordance with the invention.
Figure 2:
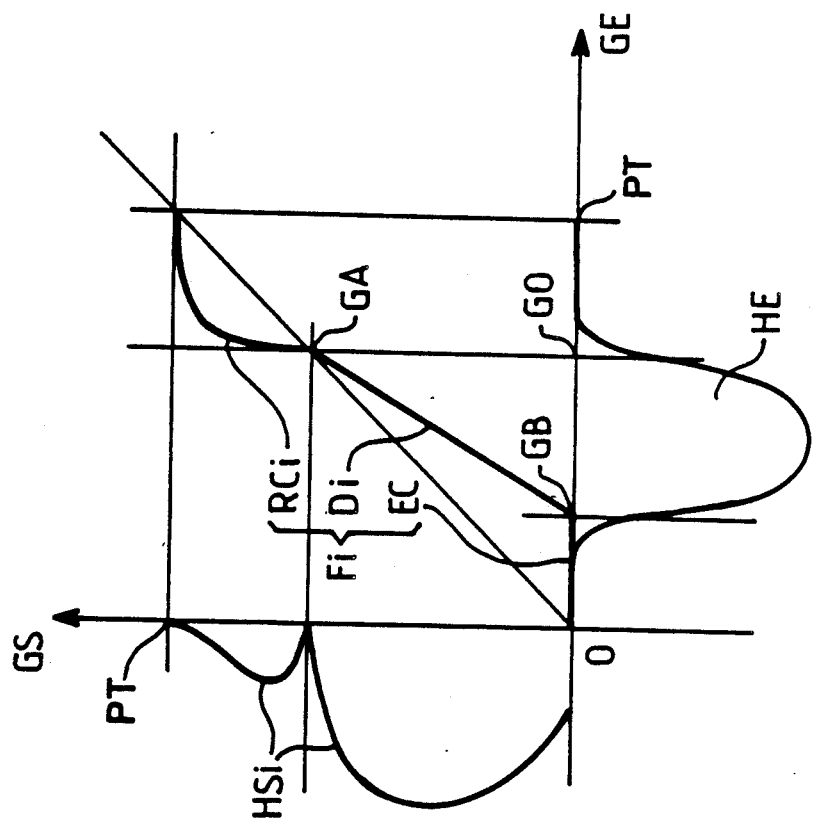

FIGS. 1a to 2b are of similar appearances, namely: the horizontal axis GE represents the scale of the grey levels at the input, these levels have an overall possible value range from 0 to PT. the vertical axis GS represents the scale of the grey levels at the output whose possible levels are also from 0 to PT by way of example FIGS. 1a, 1b and 2 contain an identical input histogram HE to show that with different transfer functions Fxx different output histograms HSxx are obtained the histogram HE is of a low contrast because of the fact that it uses only a narrow range PP among the possible values; for each grey level value "i" an input image has a number "n_i" of pixels having this value, if, for example, the image contains 512×512=262,144 pixels and 128 grey levels are possible, it is obvious that the sum of "n_i" when "i" varies from 1 to 128 is 262,144, which is illustrated by the hatched area of FIG. 1a.

FIG. 1a shows a first known transfer function FC1; the straight line FC1 defines an output grey level "j" which corresponds to each input grey level "i"; the resultant histogram HSC1 of the output image is here shown by way of example although in the described method the output histogram is not constructed as such.

FIG. 1b shows a second known transfer function FC2; the extreme surfaces of the histogram are hatched and the pixels corresponding to the input image are clipped and recovered with the corresponding extreme grey levels; the total percentage of the clipped extreme pixels is of the order of some percents, for example 5%; this results in that the slope of the straight line FC2 is superior to the slope of the straight line FC1 and consequently that the output image is of a still higher contrast than the input image; the output histogram HSC2 is also shown.

A transfer function FI in accordance with the invention is shown in FIG. 2.

The transfer function FI is composed of three parts: a straight part EC located between the points 0 and GB, this part corresponds to clipping of the weak grey levels, a straight part DI located between two input grey level values of a low level GB and a high level GO a curved part RCI located between the value GO and the maximum value PT; the curve RCI is such that it enhances the contrast for the relevant pixels, it is, for example, a curve of the "square root" type which is advantageous for the simplicity of the calculations in the binary mode.

The straight part DI is defined by the two points GB and GA; the point GB is located on the horizontal axis and the point GA is located on the diagonal of the slope equal to 1, that is to say on the neutral law of transformation.

Figure 3:
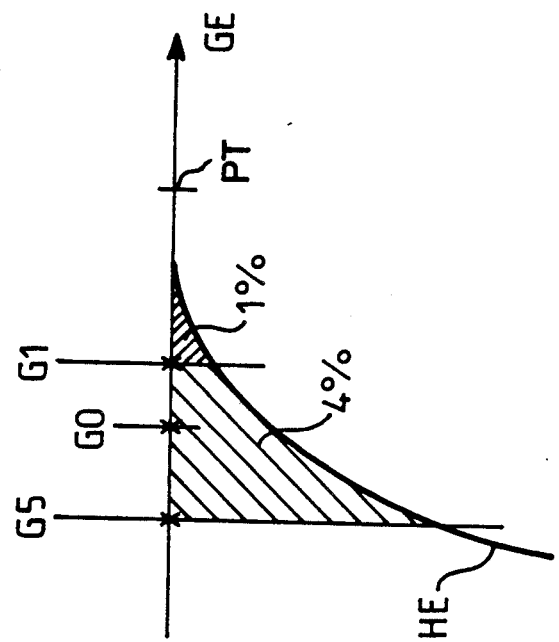
FIG. 3 shows an extreme zone of the histogram.

The input grey levels GB and CO are determined in a manner which will be described hereinafter with reference to FIG. 3 first of all the 5% of input pixels which are the brightest are counted, that is to say which have the highest grey levels which determines the grey level G5; with the digital example already described, 5% of the pixels correspond to 5% of 262,144, or 13,107 pixels. From this level G5 it is investigated how many grey levels one must pass through to diminish the number of pixels by 0.5% (i.e. 1,311 pixels); this is the same as stating that a significant change in the slope in the curve of the histogram is sought for; for the case in which there are 128 possible grey levels, passing through the 5 levels may be considered as a significant change in the slope for the case of infrared images; if therefore, when passing from 5 to 4.5% one no longer passes through 5 levels, the operation is started again between 4.5% and 4% in steps of 0.5% in order to find the looked for value GO; if on arriving at the point G1 which corresponds to 1% of the pixels, a pass through more than 5 levels has not been found, G1 is taken as the clipping value; in the general case considered here of a low-contrast infrared image, the point GO is found between the value G5 (5%) and the value G1 (1%) of the grey levels; on the basis of GO, the point GA situated on the diagonal, as mentioned in the foregoing is determined. The point GB is determined in a similar manner by considering the less bright pixels and by searching in the same manner for a significant change in the slope between 5% and 1% of the less bright pixels.

In FIG. 2 the transfer function shown furnishes an output image which is formed in the following manner: the input pixels less than GB are recovered with the minimum grey level, the input pixels located between GB and GO are recovered in accordance with the transformation defined by the straight line DI, the input pixels located between GO and PT are recovered in accordance with the transformation defined by the curve RCI, typically a square root function.

Figure 2B:
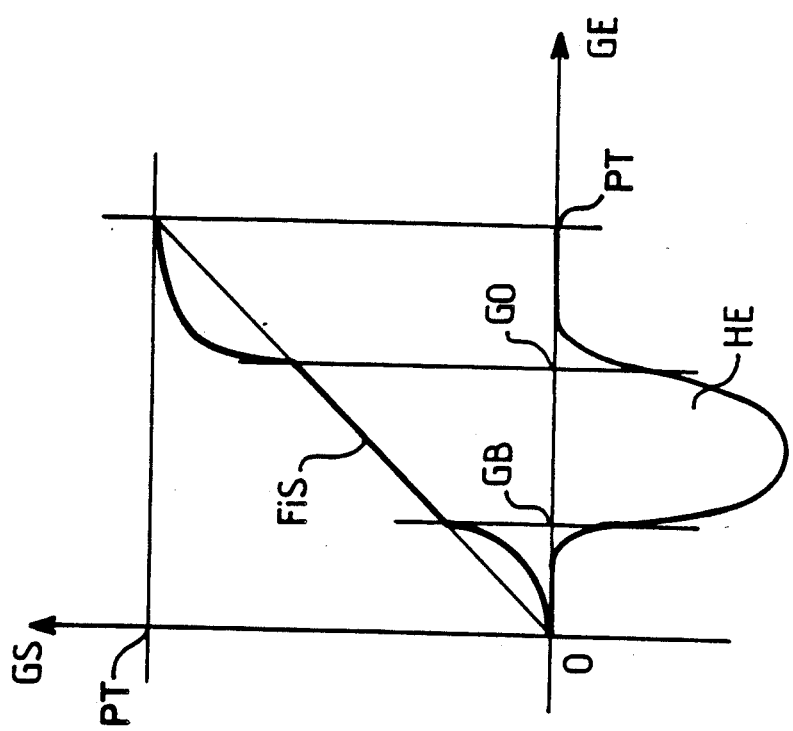

The overall transfer function FI thus defined corresponds to a preferred embodiment in accordance with the invention, but other variants are also possible: in FIG. 2a the function is simply FII inverted and the contrast is enhanced for the less bright pixels. in FIG. 2b, (FIS) the square root function has been introduced at two ends, which increases the contrast both for the black objects and for the white objects; in contradistinction thereto, the average pixels are not modified as the right hand part is then the neutral transformation in accordance with the diagonal.

Whatever the variants opted for for the transformation function, its implementation in a static system does not offer any difficulty, such a system must obviously include at least one memory for storing the input image, processing means for performing (in the static mode) the steps of the method, and a memory for storing the output image.

In a dynamic system, also denoted "real time" system, it is also obvious that the system includes furthermore a television camera and an analog/digital converter for supplying an input image, and also a digital/analog converter and display means for displaying the output image; such a dynamic system functions in known manner at the television rate, that is to say at 25 images per second and such infrared cameras are well known to a person skilled in the art who knows that, taking account of the processing time, the output images are displayed with a slight delay of the order of 1 or 2 images, which is not a drawback; the use of the method in accordance with the invention is, as has been stated in the foregoing, sufficiently fast to ensure that no additional delay is introduced and putting into operation in a system does not give any difficulties for a person skilled in the art.

By way of variation, the input images can be supplied by a magnetoscope or any other appropriate means; the output images can be displayed on a screen, and/or stored on an adequate support.

I claim:

1. A digital method of modifying an image to obtain an output image on the basis of an input image, each image being defined by a set of picture elements, denoted pixels hereinafter, each pixel containing at least a digital value defining its grey level among a set of possible values, said method comprising:

a first stage in which a histogram is established which is representative of the distribution in a percent figure of the grey levels of the pixels of said input image, a second stage in which, on the basis of the distribution characteristics of said histogram a correspondence function is established between the input and output grey levels, a third stage in which the output image is formed on the basis of the pixels of the input image and of said correspondence function, said correspondence function consisting of clipping the pixels having extreme grey levels and of linearly re-distributing the grey levels of the remaining pixels, wherein clipping of the extreme grey level pixels is effected on the basis of an input grey level value which is specific for each image and is determined during the second stage, said input grey level value being chosen so as to provide that the grey level corresponds to a change in the significant slope of the curve of the established histogram, which change of slope is located between a predetermined first and a second accrued percentage figure.

2. A digital method of modifying an image as claimed in claim 1, the extreme grey levels being either white or black, characterized in that at least the input pixels of one of grey level extremes are recovered in accordance with a transfer function which enhances the image contrast.

3. A digital method of modifying an image as claimed in claim 2, characterized in that the input pixels of the two grey level extremes are recovered in accordance with a transfer function which enhances the image contrast.

4. A digital method of modifying an image as claimed in claim 2, characterized in that the transfer function which enhances the image contrast is the "square root" function.

5. A digital method of modifying an image as claimed in claim 1, characterized in that said first and second accrued predetermined percentage figures are 5% and 1%.

6. A digital method of modifying an image as claimed in claim 1, the available input grey levels having 128 values, characterized in that said significant change of slope of the curve of the established histogram corresponds to a grey level value for which a change of 0.5% in the accrued percentage figure requires at least that 5 grey levels are passed through.

7. A digital method of modifying an image as claimed in claim 6, characterized in that the grey level value is fixed at the value corresponding to 10% if said pass-through has not been found between 5% and 1%.

* * * * *